United States Patent [19]

Burnside

[11] Patent Number: 4,685,176
[45] Date of Patent: Aug. 11, 1987

[54] SAFETY FASTENER

[75] Inventor: Martin B. Burnside, Pinner, England

[73] Assignee: Aircraft Materials Limited, Hertfordshire, England

[21] Appl. No.: 886,909

[22] Filed: Jul. 18, 1986

[30] Foreign Application Priority Data

Jul. 22, 1985 [GB] United Kingdom ............... 8518408

[51] Int. Cl.⁴ .............................................. A44B 11/25
[52] U.S. Cl. ........................................ 24/631; 24/632
[58] Field of Search ................ 24/631, 632, 633, 634, 24/635, 640, 641

[56] References Cited

U.S. PATENT DOCUMENTS

| | | | |
|---|---|---|---|
| 3,132,399 | 5/1964 | Cooper | 24/632 |
| 3,617,019 | 11/1971 | Femia | 24/631 |
| 3,639,948 | 2/1972 | Sherman | 24/632 |
| 4,403,376 | 9/1983 | Polloks | 24/631 |

FOREIGN PATENT DOCUMENTS 915168  1/1963  United Kingdom ................ 24/632

*Primary Examiner*—Victor N. Sakran
*Attorney, Agent, or Firm*—Watson, Cole, Grindle & Watson

[57] ABSTRACT

A safety fastener for lugs includes two bolts pivotally mounted to a block in a cylindrical hollow body. The bolts can move between a lug-engaging latching disposition and a lug-releasing unlatching disposition, and are biased to the latching disposition by springs. A carrier disc is rotatable between a locking disposition and a release disposition to rotate a bolt-blocking member from a retracted disposition to a bolt-obstructing disposition. When the member is in its retracted disposition it allows the bolts to be displaced out of their latching disposition to accept the lugs. When the member is in its bolt-obstructing disposition it prevents this displacement of the bolts, and therefore prevents engagement of the lugs.

A yoke is pivotable on the carrier from a rest disposition to a displacement disposition protruding from the carrier only when the carrier is in its release disposition. When the yoke is in its displacement disposition, camming surfaces thereon move the bolts to their lug-releasing dispositions.

10 Claims, 9 Drawing Figures

SAFETY FASTENER

The present invention relates to a safety fastener, and more particularly to a safety fastener adapted to engage and to be released from at least one lug.

Although the invention is not restricted in any way in its application it is particularly suitable to a safety fastener for at least one lug of a harness such as a parachute harness. Such a fastener is commonly referred to as a "quick release fitting".

According to the present invention there is provided a safety fastener for a lug comprising a hollow body, a bolt pivotably mounted to the body within the body for movement between a lug-engaging latching disposition and a lug-releasing unlatching disposition, and biased to the latching disposition, an actuator assembly including a carrier mounted on the body for movement between a locking disposition and a release disposition, a manually-operable release means mounted on the carrier and movable in a different mode from the carrier from a rest disposition to a displacement disposition to drive the bolt against its bias from its latching to its unlatching disposition, and in the reverse direction to allow the bolt to return, the said movement of the release means being possible only when the carrier is in the release disposition, the carrier and the bolt being arranged so that the bolt cannot move to the unlatching disposition whilst the carrier is in its locking disposition, the actuator assembly including a bolt-blocking member movable, upon movement of the carrier from its locking disposition to its release disposition, from a retracted disposition to allow sufficient displacement of the bolt out of the latching disposition to enable it to engage the lug, to a bolt-obstructing disposition in which it prevents the said displacement of the bolt, thereby preventing engagement of the lug, the fastener including restraining means to prevent movement of the release means from the rest disposition to the displacement disposition until the carrier has been moved to the release disposition, whereby release of the lug from engagement by the bolt is accomplished only upon a sequential movement of, first, the carrier to the release disposition and secondly the release means to the displacement disposition.

The release means may be in the form of a lever.

Preferably the fastener has the form of a cylinder, with at least two bolts arranged within the cylindrical body to receive lugs at spaced points around the periphery of the cylindrical surface of the body. Preferably the carrier takes the form of a disc mounted for oscillatory movement between the locking and release dispositions about the longitudinal axis of the cylindrical body. Preferably the lever takes the form of a yoke pivotable on the carrier from its rest disposition flush with the carrier to its displacement disposition protruding from the carrier.

For a better understanding of the present invention, and to show more clearly how the same may be carried into effect, reference will now be made, by way of example, to the accompanying drawings, in which.

Figure 1:
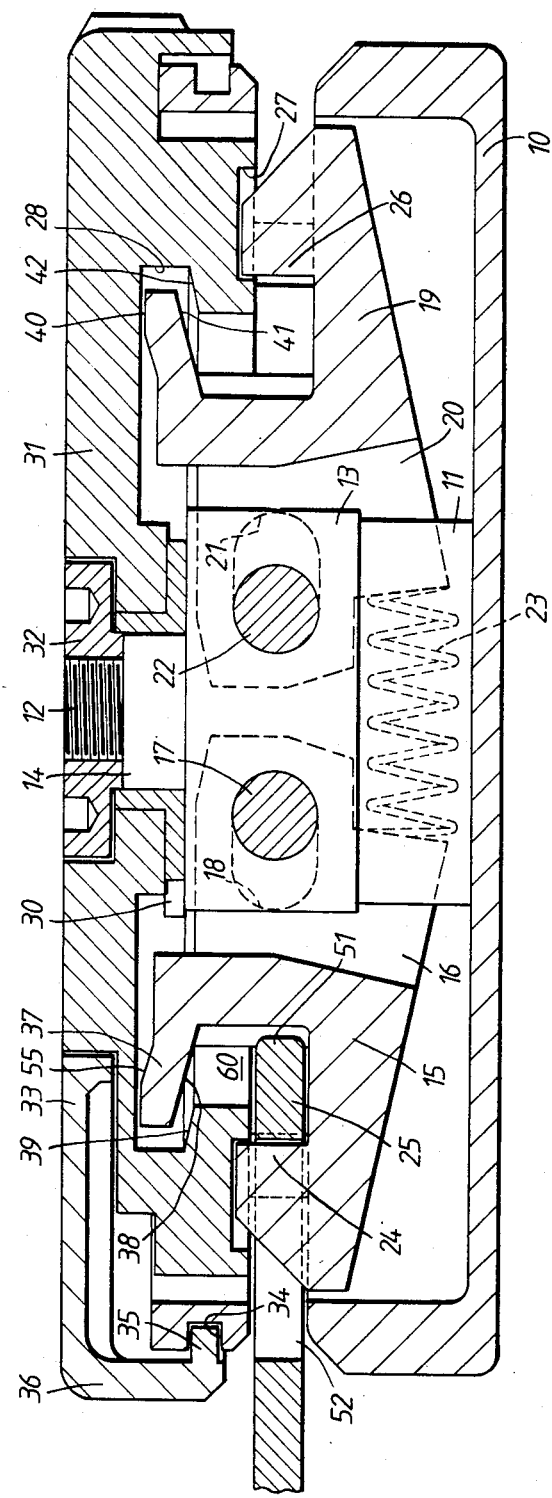
FIG. 1 is a diametral section of a preferred embodiment of fastener in accordance with the invention.

The fastener of FIG. 1 comprises a hollow body 10 of cylindrical form and with a central pedestal 11 and axle bolt 12. Mounted on the bolt 12 and pedestal 11 is a block 13 with an upstanding boss 14. A first bolt 15 has a pair of limbs 16 which flank the block 13 and are mounted to it by a pin 17 fixedly mounted to the block 13 and extending through like elongate apertures 18 in each of the limbs 16. In like fashion a second bolt 19 has a pair of limbs 20 with apertures 21 through which extends a pin 22 also fixedly held in the block 13. A pair of compression springs 23, each one trapped between one of the limbs 16 and one of the limbs 20, biases the bolts 15 and 19 to the positions shown in FIG. 1, that is, the latching disposition of the bolts 16 and 19, in which a spigot portion 24 of the bolt 15 engages a harness lug 25 and likewise a spigot portion 26 of the bolt 19 engages another harness lug (not shown).

On the boss 14 is carried a bolt-blocking member 30 and a carrier disc 31, both being held to the body 10 by a nut 32, threaded on the axle bolt 12. The carrier disc 31 has an annular recess 27 into which protrudes the tips of the bolt spigots 24 and 26. To the carrier disc 31 is pivotably mounted by a pair of pins 53 (FIG. 6) a release lever 33. The cylindrical periphery of the body 10 includes an annular recess 34 which receives a projection 35 of corresponding shape on a handle portion 36 of the lever 33. The bolt 15 includes an extension 37 with an undersurface 38 facing a stop surface 39 on an annular recess 28 of the carrier disc 31. Likewise, the bolt 19 has an extension 40 with an undersurface 41 facing a second stop surface 42.

Figure 2:
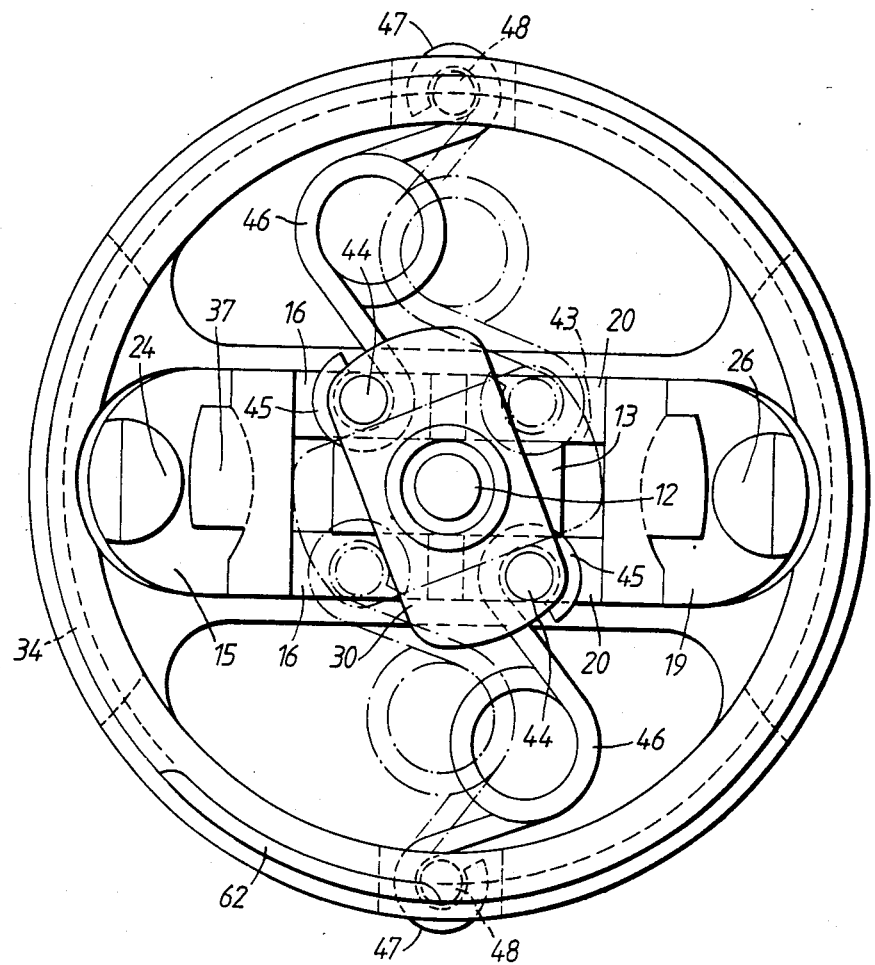
FIG. 2 is a plan view of the fastener of FIG. 1, with its carrier disc and associated lever omitted for the sake of clarity.

Referring now to FIG. 2, the bolt-blocking member 30 is shown in full line in its retracted disposition and in broken line 43 in its bolt-obstructing disposition. Pegs 44 pin the member 30 to the carrier disc 31, and provide anchorage for inward ends 45 of torsion springs 46 with outward ends 47 carried on pegs 48 mounted in the peripheral part of the fastener body 10. The torsion springs 46 are stressed upon rotation of the carrier disc, thereby to urge the disc and the bolt-blocking member 30 into stable dispositions at each end of the quadrant of movement of the disc, i.e. its locking disposition, as shown in full line in FIG. 1, and its release disposition, as shown in broken line.

Figure 9:
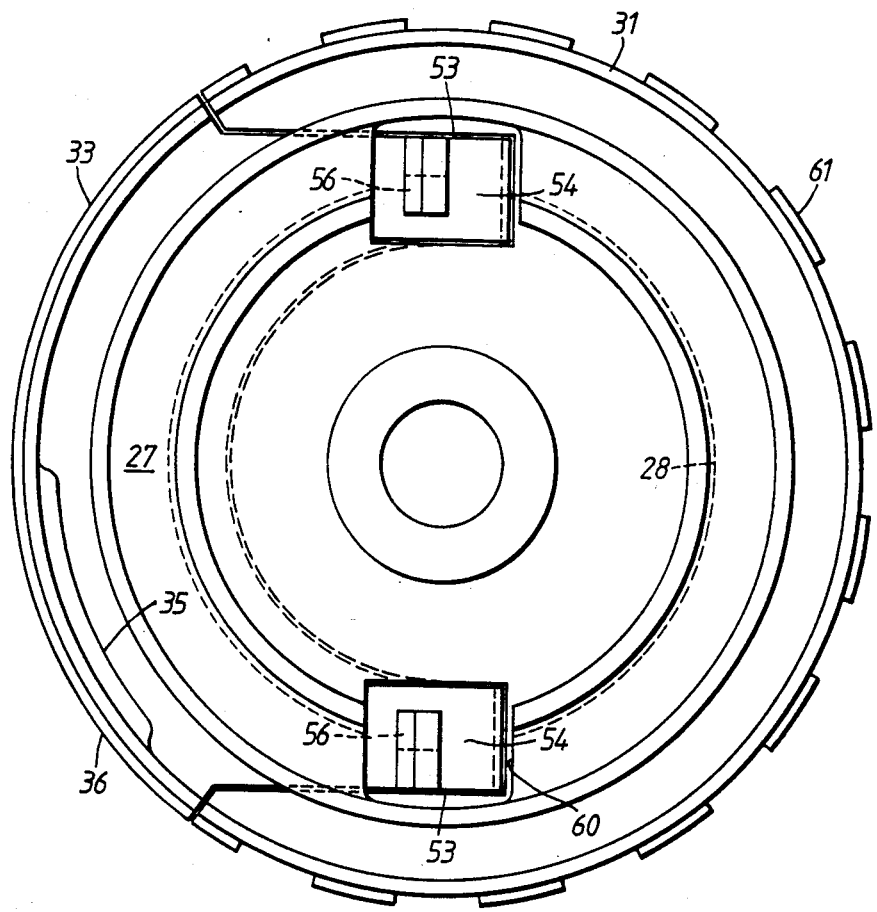
FIG. 9 is an underneath plan view of the carrier disc.

FIG. 9 shows the underside of the carrier disc 31 and lever 33. The pins 53 which connect the disc and lever are just visible and so too is a camming surface 54 and stop surface 56 on the tip of each limb of the yoke-shaped lever 33. Also visible is the projection 35 on the lever 33 which engages with the recess 34, and a series of finger-grip projections 61 around the periphery of the disc 31.

With the disc 31 and body 10 in the relative positions of FIGS. 2 and 9, the projection 35 is in the recess 34 so the lever cannot be raised. The bolt-blocking member 30 does not prevent engagement of lugs with the bolts 15 and 19. Rotation of the disc by 90° relative to the body in FIG. 2 from its locking disposition to its release disposition brings the projection 35 of the lever into line with a region 62 of the body 10 where the annular recess 34 is open to the top, the camming surfaces 54 over the bolts 15 and 19, and the bolt-blocking member 30 in the broken line disposition 43.

Operation of the fastener is in accordance with what is shown in FIGS. 3 to 8, and as described below.

Figure 3:
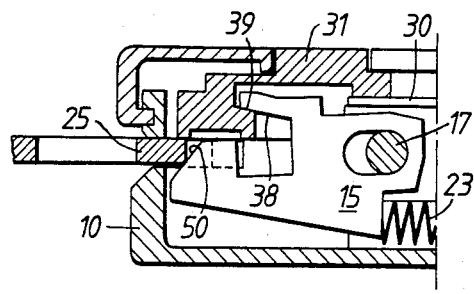
FIGS. 3 to 8 are a series of partial sections in the same plane as FIG. 1, showing different dispositions of the moving parts of the fastener.

Engagement of a lug 25 with the fastener begins, as is shown in FIG. 3, with depression of the bolt 15 downwardly from its latching disposition, as the lug 25 presses on the inclined end surface 50 of the bolt 15, until the surfaces 38 and 39 are in mutual contact.

Continuing pressure from the lug 25 drives the bolt 15 inwardly (FIG. 4), towards the centre of the fastener body 10, the bolt 15 sliding over the pin 17 and the stop surface 39, with further compression of the spring 23.

Figure 5:
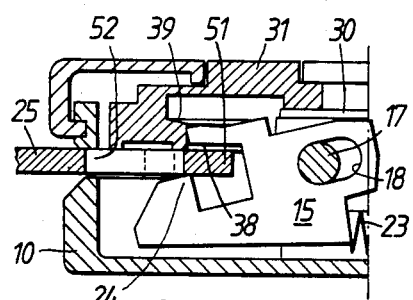

As seen in FIG. 5, just as the bolt 15 reaches the limit of its inward movement, as determined by the dimensions of the elongate slot 18, its surface 38 slips past the end of the stop surface 39 on the carrier disc 31, allowing the spigot part 24 of the bolt 15 to move downwardly far enough to allow the tip portion 51 of the lug 25 to slide past the spigot 24, so that the spigot may be received in its intended recess 52 in the lug 25, being driven upwardly into this latched disposition by the pressure from the two compression springs 23. This same pressure, as well as any tension in the harness connected to the lug 25, will pull the bolt 15 towards the periphery of the housing 10, as shown in FIG. 6, until the pin 17 prevents any further outward movement by its contact with the inward end of the elongate slot 18.

Figure 6:
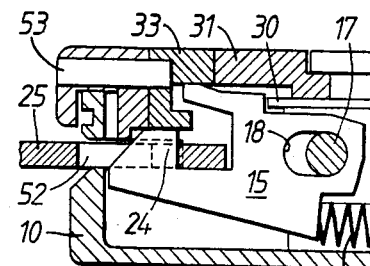
Figure 4:
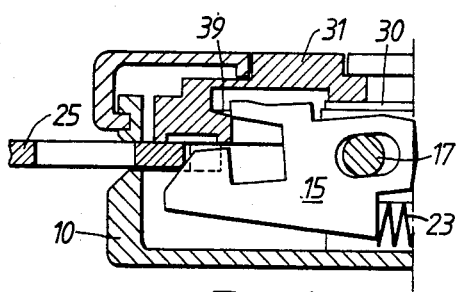

For release of the lug 25 from the bolt 15, the carrier disc 31 is first rotated to its release disposition, as shown in FIG. 6. The biasing action of the torsion springs 46 at first opposes such rotation but, as rotation continues, then urges the disc forward into its release disposition. Such movement carries the lever 33 in the same rotation relative to the body 10, and carries the projection 35 on the handle part 36 of the lever 33 to a region on the periphery of the body 10 where the recess 34 is open to the top, so that the handle part 36 can be raised relative to the body, where the lever 33 can be pivoted on its mounting pins 53 for release of the lug 25, as explained below.

FIG. 6 also shows that, with the carrier disc 31 in its release disposition, the bolt-blocking member 30 protrudes radially further than when the disc 31 is in its locking disposition.

Figure 7:
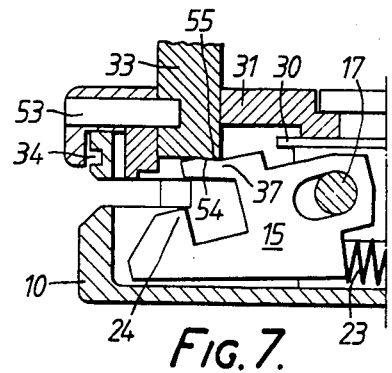

Referring now to FIG. 7, it can be seen how pivotal movement of the lever 33 on its mounting pins 53 causes the camming surface 54 on the lever to press against a cammed surface 55 on the extension 37 of the bolt 15 and drive the bolt 15 downwardly until the lug 25 is released from the spigot 24. When the lever 33 is in the raised, displacement disposition of FIG. 7, the extensions 37 of the bolts 15 are accommodated in respective radial slots 60 in the carrier disc 31. This prevents any rotation of the carrier disc 31 on the body 10, for as long as the lever remains raised. Thus, the lever must be moved to its rest disposition, so that the bolts 15 can rise to their latching dispositions, before the disc 31 can be rotated to its locking disposition, so ensuring that the projection 35 on the lever 33 makes proper engagement with the recess 34.

Figure 8:
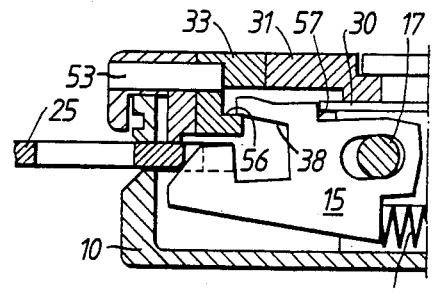

Turning now to FIG. 8, with the carrier disc 31 in its release disposition, it is not possible to bring a lug 25 into engagement with the bolt 15 because inward movement of the bolt 15, sufficient for the undersurface 38 of the bolt to clear a stop surface 56 of the lever 33, is prevented by the abutment of a stop surface 57 on the bolt 15 with the radially outward facing surface of the bolt-blocking member 30.

In another embodiment, the torsion springs 46 are replaced by leaf springs stressed by rollers mounted on axles carried by the carrier disc 31. The axle bolt 12 could be screwed into the pedestal 11 and have a bolt head instead of the nut 32.

The fastener shown in the drawings meets current Ministry of Defence requirements and is sufficiently thin for use in aircraft cockpits of the most restricted size. An important feature of the design is that the points of engagement of the harness lugs by the fastener are located closer to the outside diameter of the fastener body than in some other design proposals, one advantage of this being to reduce the restrictive effect of the webbing leg loops through which pass the harness lugs engaged with the fastener, particularly when the wearer is suspended in the harness. Another advantage of the design is that it requires no knob locking mechanism, so that the harness lugs do not require to have a specific profile. Another advantage is that the carrier disc rotates in one plane only, making it less likely that release of the lugs would be inhibited by the presence of any harness webbing loops which have slid inwardly against the body of the fastener. Yet another advantage is that the use of a lever to effect release makes available a mechanical advantage which facilitates release of lugs under water. Preferably the fastener is arranged in the harness relative to the wearer such that, for release, the lever is pulled upwardly.

An especially important advantage is that tension in the harness is carried across the fastener by the steel bolts 15 and 19, the steel pins 17 and 22 and centre block 13, which together form an articulated strongplate assembly. With other designs, where the tension is borne by the body 10, making the body from aluminium compromises the strength of the fastener. Conversely, with the use of an articulated steel strongplate far less body strength is needed so that the body can be of less weighty construction, perhaps even of plastics material. The articulated strongplate assembly has potential to be usefully lighter in weight than a solid steel plate which carries spigots to engage the harness lugs, and is, furthermore, very easy to assemble and introduce into the body for manufacture of the fastener. When under load in use, it is in stable equilibrium. In some previous proposals, a solid steel plate has to undergo the movements of a swash plate for engagement of any one individual lug, so that there is unwanted relative movement between the plate and already-engaged lugs. With the present articulated assembly, however, such unwanted movements are avoided.

I claim:

1. A safety fastener for a lug comprising a hollow body, a bolt pivotably mounted to the body within the body for movement between a lug-engaging latching disposition and a lug-releasing unlatching disposition, and biased to the latching disposition, an actuator assembly including a carrier mounted on the body for movement between a locking disposition and a release disposition, a manually-operable release means mounted on the carrier and movable in a different mode from the carrier from a rest disposition to a displacement disposition to drive the bolt against its bias from its latching to its unlatching disposition, and in the reverse direction to allow the bolt to return, the said movement of the release means being possible only when the carrier is in the release disposition, the carrier and the bolt being arranged so that the bolt cannot move to the unlatching disposition whilst the carrier is in its locking disposition, the actuator assembly including a bolt-blocking member movable, upon movement of the carrier from its locking disposition to its release disposition, from a retracted disposition to allow sufficient displacement of the bolt out of the latching disposition to enable it to engage the lug, to a bolt-obstructing disposition in which it prevents the said displacement of the bolt, thereby preventing engagement of the lug, the fastener including restraining means to prevent movement of the release means from the rest disposition to the displacement disposition until the carrier has been moved to the release disposition, whereby release of the lug from engagement by the bolt is accomplished only upon a sequential movement of, first, the carrier to the release disposition and secondly the release means to the displacement disposition.

2. A safety fastener as claimed in claim 1 in which the release means is a lever.

3. A safety fastener as claimed in claim 2 in which the lever is a yoke pivotable on the carrier from its rest disposition flush with the carrier to its displacement disposition protruding from the carrier.

4. A safety fastener as claimed in claim 1 in which the body is in the form of a cylinder.

5. A safety fastener as claimed in claim 4 comprising at least two bolts arranged within the cylindrical body to receive lugs at spaced points around the periphery of the cylindrical surface of the body.

6. A safety fastener as claimed in claim 5 in which the carrier is in the form of a disc mounted for oscillatory movement between the locking disposition and release disposition about the longitudinal axis of the cylindrical body.

7. A safety fastener as claimed in claim 6 including a camming surface mounted on the release means to move an associated bolt to said lug-releasing unlatching disposition on movement of the yoke from its rest disposition to its displacement disposition.

8. A safety fastener as claimed in claim 5 in which the bolts are pivotally mounted on a support block located in the body, the said support block and lugs being constructed to receive the principal operational or tension exerted on the safety fastener and lugs.

9. A safety fastener as claimed in claim 4 in which the restraining means comprises an annular recess in the body adapted to receive a projection on a handle portion of the lever.

10. A safety fastener as claimed in claim 4 including torsion springs which are stressed by rotation of the carrier to urge the carrier and the bolt locking member into stable dispositions.

* * * * *